(12) United States Patent
Kakkori

(10) Patent No.: US 9,897,776 B2
(45) Date of Patent: Feb. 20, 2018

(54) APPARATUS, METHOD AND COMPUTER PROGRAM FOR CAPTURING IMAGES

(71) Applicant: Nokia Technologies Oy, Espoo (FI)

(72) Inventor: Hannu Kakkori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/776,999

(22) PCT Filed: Mar. 15, 2013

(86) PCT No.: PCT/FI2013/050295
§ 371 (c)(1),
(2) Date: Sep. 15, 2015

(87) PCT Pub. No.: WO2014/140413
PCT Pub. Date: Sep. 18, 2014

(65) Prior Publication Data
US 2016/0033738 A1    Feb. 4, 2016

(51) Int. Cl.
| | |
|---|---|
| *H04N 5/232* | (2006.01) |
| *H04N 5/262* | (2006.01) |
| *G02B 7/38* | (2006.01) |
| *G02B 17/00* | (2006.01) |
| *G03B 3/10* | (2006.01) |
| *G03B 13/32* | (2006.01) |

(Continued)

(52) U.S. Cl.
CPC ........... *G02B 7/38* (2013.01); *G02B 27/0075* (2013.01); *G03B 3/10* (2013.01); *G03B 13/32* (2013.01); *G06K 9/46* (2013.01); *H04N 5/23212* (2013.01); *H04N 5/2628* (2013.01); *G06K 2009/4666* (2013.01)

(58) Field of Classification Search
CPC .. G02B 7/38; G02B 27/0075; H04N 5/23212; H04N 5/2628; G06K 9/46; G03B 3/10; G03B 13/32
USPC ......... 348/345, 349, 296, 367, 326, 362, 57, 348/433.1, 433; 382/254, 255, 171, 173, 382/164, 264; 396/121, 123, 124, 234
See application file for complete search history.

(56) References Cited

U.S. PATENT DOCUMENTS 6,240,253 B1 *  5/2001  Yamaguchi ............ G03B 13/36
                                                                    396/123
6,956,612 B2 * 10/2005  Bean ....................... G03B 9/08
                                                                    348/345

(Continued)

FOREIGN PATENT DOCUMENTS

WO     WO 2012/117733 A1     9/2012

OTHER PUBLICATIONS

Zhou, C. et al.; "Focal Sweep Camera for Space-Time Refocusing"; Technical Report, Department of Computer Science, Columbia University; Nov. 1, 2012; pp. 1-13.

(Continued)

*Primary Examiner* — Tuan Ho
*Assistant Examiner* — Marly Camargo
(74) *Attorney, Agent, or Firm* — Harrington & Smith

(57) ABSTRACT

An apparatus, method and computer program wherein the apparatus includes an image sensor, an optical arrangement including at least one adjustable focusing element; wherein the adjustable focusing element is configured to alternate between a first focus distance and a second focus distance as an image is captured by the image sensor.

23 Claims, 15 Drawing Sheets

Figure 1:
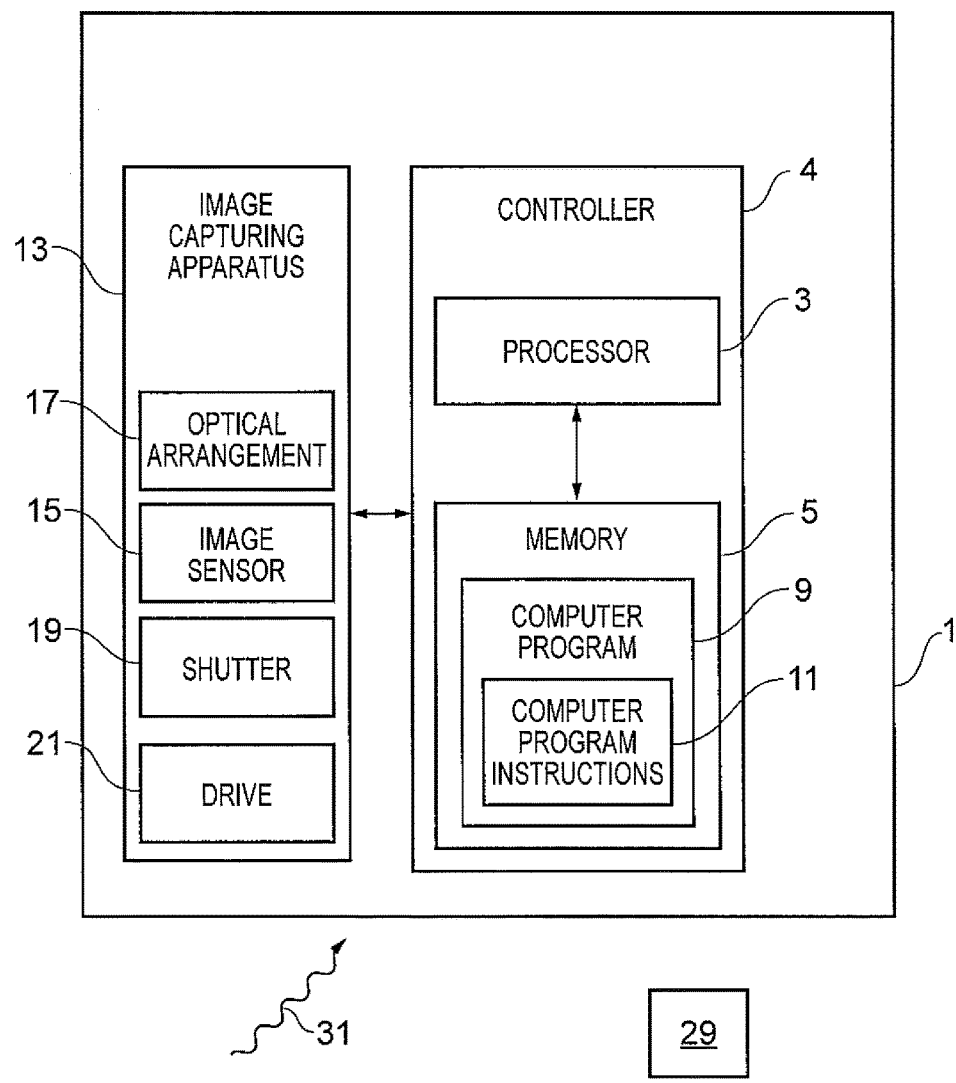

(51) Int. Cl.
G02B 27/00 (2006.01)
G06K 9/46 (2006.01)

(56) References Cited

U.S. PATENT DOCUMENTS

| | | | |
|---|---|---|---|
| 7,262,798 B2* | 8/2007 | Stavely et al. | H04N 5/20 |
| | | | 348/255 |
| 9,083,880 B2* | 7/2015 | Shimamoto | G02B 7/38 |
| 2008/0292298 A1* | 11/2008 | Hirai | G03B 13/36 |
| | | | 396/123 |
| 2010/0026852 A1 | 2/2010 | Ng et al. | 348/239 |
| 2010/0060748 A1 | 3/2010 | Tsuchiya | 348/222.1 |
| 2011/0169985 A1 | 7/2011 | Cooper | 348/241 |
| 2011/0292364 A1 | 12/2011 | Kawamura | 355/55 |
| 2012/0154668 A1 | 6/2012 | Kimura et al. | 348/348 |
| 2013/0010160 A1 | 1/2013 | Kawamura | 348/231.99 |
| 2014/0125831 A1* | 5/2014 | Chan | H04N 5/228 |
| | | | 348/222.1 |

OTHER PUBLICATIONS

Nagahara, H. et al.; "Flexible Depth of Field Photography"; 10$^{th}$ European Conference on Computer Vision, ECCV 2008; Oct. 12, 2008; Marseille, France; pp. 60-73.

Kutulakos, K. et al.; "Focal Stack Photography: High-Performance Photography with a Conventional Camera"; IAPR Conference on Machine Vision Applications; May 22, 2009; Yokohama, Japan; pp. 332-337.

* cited by examiner

APPARATUS, METHOD AND COMPUTER PROGRAM FOR CAPTURING IMAGES

TECHNOLOGICAL FIELD

Examples of the present disclosure relate to an apparatus, method and computer program for capturing images. In particular, they relate to an apparatus, method and computer program for capturing images with different focus distances.

BACKGROUND

Apparatus which enable a user to capture images such as digital cameras are known. Such apparatus might only be able to capture an image at a single focus distance. This may lead to a number of problems. For example, if the image is captured using the wrong focus distance then important information may be lost or blurred in the obtained image.

It may be beneficial to provide an improved apparatus for capturing images.

BRIEF SUMMARY

According to various, but not necessarily all, examples of the disclosure, there may be provided an apparatus comprising: an image sensor, an optical arrangement comprising at least one adjustable focussing element; wherein the adjustable focussing element is configured to alternate between a first focus distance and a second focus distance as an image is captured by the image sensor.

In some examples the apparatus may comprise a rolling shutter. The adjustable focussing element may be synchronised with the rolling shutter.

In some examples the adjustable focussing element may be configured to alternate between the first focus distance and the second focus distance a plurality of times as the image is captured by the image sensor.

In some examples the adjustable focussing element may be configured to provide a plurality of focus distances between the first focus distance and the second focus distance.

In some examples the first focus distance may comprise a distance which is far away from the apparatus. The first focus distance may comprise infinity.

In some examples the second focus distance may comprise a distance close to the apparatus.

In some examples the image captured by the image sensor may comprise a plurality of regions where the regions have different focus distances. In some examples the regions may comprise a plurality of stripes across the image. The apparatus may be further configured to obtain at least one focussed image from a subset of the plurality of regions of the image captured by the image sensor.

In some examples the processor may be configured to identify a subset of the plurality of regions of the image captured by the image sensor where each of the regions in the identified subset have the same focus distance. In some examples the processor may be configured to obtain a focussed image by rescaling the identified subset of regions of the image captured by the image sensor.

According to various, but not necessarily all, examples of the disclosure, there may be provided a method comprising: adjusting an adjustable focussing element of an optical arrangement between a first focus distance and a second focus distance; and enabling an image to be captured by an image sensor as the adjustable focussing element is adjusted.

In some examples the image may be captured using a rolling shutter. The adjustable focussing element may be synchronised with the rolling shutter.

In some examples adjusting the adjustable focussing element may comprise alternating between the first focus distance and the second focus distance a plurality of times as the image is captured by the image sensor.

In some examples adjusting the adjustable focussing element comprises providing a plurality of focus distances between the first focus distance and the second focus distance.

In some examples the first focus distance may comprise a distance which is far away from the apparatus. The first focus distance may comprise infinity.

In some examples the second focus distance may comprise a distance close to the apparatus.

In some examples the image captured by the image sensor may comprise a plurality of regions where the regions have different focus distances. The regions comprise a plurality of stripes across the image.

In some examples the method may further comprise obtaining at least one focussed image from a subset of the plurality of regions of the image captured by the image sensor. In some examples the method may also comprise identifying a subset of the plurality of regions of the image captured by the image sensor where each of the regions in the subset have the same focus distance.

In some examples the focussed image may be obtained by rescaling the identified subset of regions of the image captured by the image sensor.

According to various, but not necessarily all, examples of the disclosure, there may be provided a computer program comprising computer program instructions that, when executed by at least one processor, enable an apparatus at least to perform: adjusting an adjustable focussing element of an optical arrangement between a first focus distance and a second focus distance; and enabling an image to be captured by an image sensor as the adjustable focussing element is adjusted.

In some examples there may also be provided a computer program comprising program instructions for causing a computer to perform the methods described above.

In some examples there may also be provided a physical entity embodying the computer program as described above.

In some examples there may also be provided an electromagnetic carrier signal carrying the computer program as described above.

The apparatus may be for capturing images.

BRIEF DESCRIPTION

Figure 2:
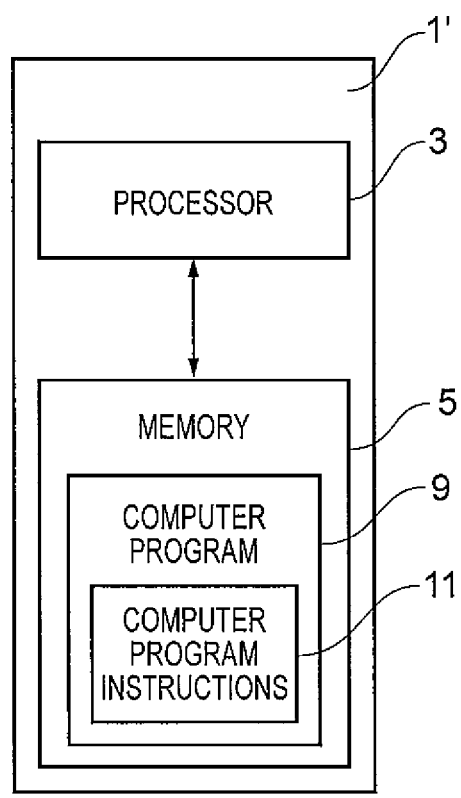
Figure 3:
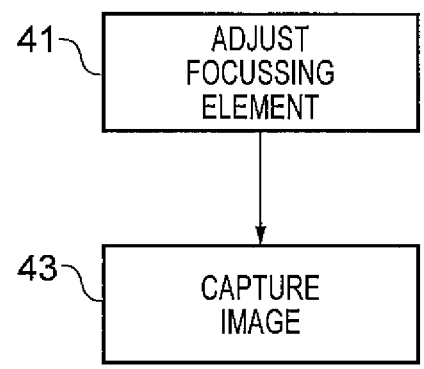
Figure 4:
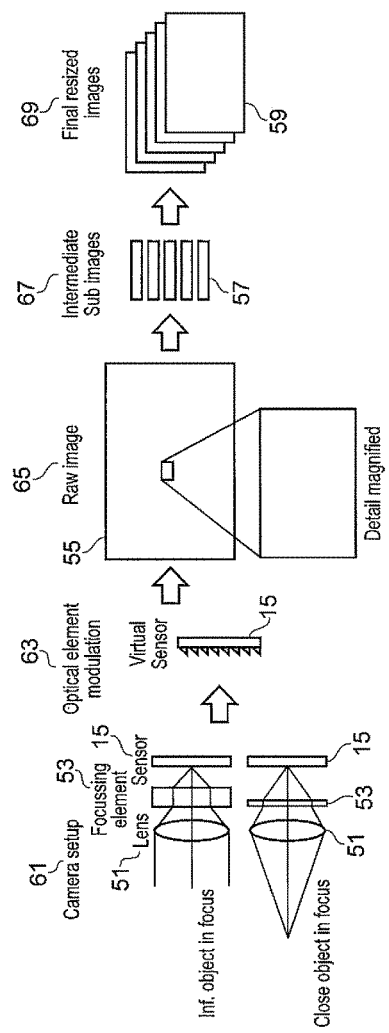

For a better understanding of various examples that are useful for understanding the detailed description, reference will now be made by way of example only to the accompanying drawings in which:

FIG. 1 illustrates an apparatus;
FIG. 2 illustrates an apparatus;
FIG. 3 illustrates a method;
FIG. 4 illustrates a method;
FIGS. 5A to 5K are representative images obtained using the examples of the detailed description.

DETAILED DESCRIPTION

The Figures illustrate an apparatus 1, method and computer program 9. In the examples the apparatus 1 comprises: an image sensor 15, an optical arrangement 17 comprising at least one adjustable focussing element; wherein the adjustable focussing element is configured to alternate between a first focus distance and a second focus distance as an image is captured by the image sensor 15.

FIG. 1 schematically illustrates an apparatus 1 according to an example of the disclosure. The apparatus 1 may be configured to enable images to be captured. The apparatus 1 may be an electronic apparatus such as a camera, a mobile cellular telephone, a tablet computer, a personal computer or any other apparatus which may be configured to enable images to be captured. The apparatus 1 may be a handheld apparatus 1 which can be carried in a user's hand, handbag or pocket of their clothing for example.

Only features referred to in the following description are illustrated in FIG. 1. However, it should be appreciated that the apparatus 1 may comprise additional features that are not illustrated. For example, in embodiments of the invention where the apparatus 1 is a mobile cellular telephone or tablet computer, the apparatus 1 may also comprise components which enable wireless communications such as a transmitter and/or receiver.

The apparatus 1 schematically illustrated in FIG. 1 comprises: a controller 4 and an image capturing apparatus 13. The controller 4 and image capturing apparatus 13 may be operationally coupled. It is to be appreciated that any number or combination of intervening elements may be provided between the respective components of the apparatus 1 including no intervening elements.

In the illustrated embodiment the controller 4 comprises at least one processor 3 and at least one memory 5. The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 29 (e.g. disk, memory etc) to be executed by such processors 3.

The controller 4 may be configured to control the apparatus 1 to perform a plurality of different functions. For example the controller 4 may be configured to control the apparatus 1 to capture and store images. In some embodiments of the disclosure the controller 4 may also be configured to perform image processing on the captured images. The controller 4 may be configured to perform image processing as described below. In some examples the controller 4 may be configured to control the image capturing apparatus 13. For example, the controller 4 may be configured to control the shutter 19 and/or the configuration of the optical arrangement 17.

The controller 4 may also be configured to enable the apparatus 1 to adjust an adjustable focussing element of the optical arrangement 17 between a first focus distance and a second focus distance; and enable an image to be captured by an image sensor 15 as the adjustable focussing element is adjusted.

The at least one memory 5 may be configured to store a computer program 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3 and 4 and described below. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for adjusting an adjustable focussing element of an optical arrangement 17 between a first focus distance and a second focus distance; and enabling an image to be captured by an image sensor 15 as the adjustable focussing element is adjusted.

The computer program 9 may arrive at the apparatus 1 via any suitable delivery mechanism 31. The delivery mechanism 31 may be, for example, a computer-readable storage medium 29, a computer program product, a memory device, a record medium such as a CD-ROM or DVD, or an article of manufacture that tangibly embodies the computer program 9. The delivery mechanism may be a signal configured to reliably transfer the computer program 9. The apparatus 1 may propagate or transmit the computer program 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

In the example illustrated in FIG. 1 the image capturing apparatus 13 comprises an optical arrangement 17, an image sensor 15 and a shutter 19. In some embodiments of the disclosure the image capturing apparatus 13 may also comprise one or more drives 21.

The image sensor 15 may comprise any means which is configured to convert light incident on the image sensor 15 into an electrical signal to enable an image to be produced. The image sensor 15 may comprise, for example, a digital image sensor such as a charge-coupled-device (CCD) or a complementary metal-oxide-semiconductor (CMOS). The at least one processor 3 may be configured to receive inputs from the image sensor 15. For example, the at least one processor 3 may be configured to retrieve an electrical signal comprising image data from the image sensor 15 and store it in the at least one memory 5. The image data may be in the form of a still image or a video image.

The optical arrangement 17 may comprise any means configured to focus or deflect incident light from an object onto the image sensor 15. The optical arrangement 17 may receive the incident light from an object or scene external to the apparatus 1 through an aperture in a housing of the apparatus 1. The optical arrangement 17 may comprise, for example, one or more optical devices such as one or more lenses.

The optical arrangement 17 may comprise at least one adjustable focussing element. The adjustable focussing element may comprise, for example, one or more lenses or a light guide or any other means which may be configured to change the focus distance of the optical arrangement 17. The adjustable focussing element may be controlled by the controller 4.

The image capturing apparatus 13 may also comprise a shutter 19. The shutter 19 may comprise any means which enables the exposure of the image sensor 15 to incident light to be controlled. The shutter 19 may be electronic or mechanical or any other suitable type of shutter 19. In some examples the shutter 19 may comprise a rolling shutter. The shutter 19 may be controlled by the controller 4.

In some example the apparatus 1 may also comprise one or more drives 21. The one or more drives 21 may comprise any means which enables movement of at least part of the optical arrangement 21 relative to the image sensor 15. In some examples the one or more drives 21 may comprise an electric motor. In embodiments of the disclosure, where the optical arrangement 17 comprises a plurality of components, the one or more drives may enable movement of some or all of the plurality of components.

FIG. 2 illustrates an apparatus 1' according to another example of the disclosure. The apparatus 1' illustrated in FIG. 2 may be a chip or a chip-set. The apparatus 1' comprises at least one processor 3 and at least one memory 5 as described above in relation to FIG. 1.

FIGS. 3 and 4 schematically illustrate methods according to examples of the disclosure. The embodiments may be implemented using the apparatus 1, 1' of FIGS. 1 and 2.

FIG. 3 illustrates an example method. At block 41 of the method an adjustable focussing element is adjusted. The adjustable focussing element may be part of an optical arrangement 17 as described above. The adjustable focussing element may be adjusted to change the focus distance of the image capturing apparatus 13. Adjusting the adjustable focussing element may comprise alternating the focus distance of the image capturing apparatus 13 between a first focus distance and a second focus distance. A plurality of focus distances between the first focus distance and the second focus distance may also be provided. The adjustable focusing element may be alternated between the two focus distances a plurality of times. The adjustable focusing element may be alternated between the two focus distances repeatedly.

In some examples the first focus distance may comprise a distance which is far away from the apparatus 1. For example the first focus distance may be infinity. In some examples the second focus distance may comprise a distance which is close to the apparatus 1.

At block 43 an image is captured on the image sensor 15. The image may be captured using any suitable technique. In some examples the image may be captured using a rolling shutter 19 so that the shutter is gradually moved across the image sensor 15. In some examples the image sensor 15 may be configured to capture interleaved frames.

Blocks 41 and 43 may occur simultaneously so that the image may be captured by the image sensor 15 at the same time that the adjustable focussing element is adjusted. The controller 4 may be configured to control the adjustment of the adjustable focussing element so that it is simultaneous with the movement of the rolling shutter 19. In some examples the controller 4 may be configured to control the adjustment of the adjustable focussing element so that it is synchronised with the movement of the rolling shutter 19.

An example of an image which may be captured at block 43 is provided in FIG. 5A and described below.

FIG. 4 schematically illustrates an example method in more detail. At block 61 an adjustable focussing element of an optical arrangement 17 is adjusted. An example configuration of the optical arrangement 17 is schematically illustrated in FIG. 4.

In the example of FIG. 4 the optical arrangement 17 comprises a lens 51 and an adjustable focussing element 53. In the example of FIG. 4 the adjustable focussing element 53 is provided between the lens 51 and the image sensor 15. The adjustable focussing element 53 may be configured to adjust the focus distance between a first focus distance and a second focus distance.

In FIG. 4 the optical arrangement is illustrated in a first configuration in which it is arranged to provide a first focus distance and a second configuration in which it is arranged to provide a second focus distance.

In the first configuration the first focus distance comprises infinity. This may enable images of objects which are located far away from the apparatus 1 to be in focus. In the second configuration the focus distance comprises a distance close to the apparatus. This may allow objects which are located close to the apparatus 1 to be in focus.

In the schematic illustration of FIG. 4 the adjustable focussing element 53 is thicker in the first configuration than in the second configuration. It is to be appreciated that any means of changing the focus distance of the optical arrangement 17 may be used in examples of the disclosure. For example the adjustable focussing element 53 may be moved relative to lens 51 and/or image sensor 15.

In some examples the adjustable focussing element 53 may comprise means for moving the lens 51 and/or other optical components relative to the image sensor 15. The means for moving the lens 51 and/or other optical components relative to the image sensor 15 may comprise, for example, an electromagnetic mechanism such as a voice coil motor (VCM). The VCM may be controlled by the controller 4.

In some examples the adjustable focussing element 53 means for controlling the thickness and/or curvature of one or more lenses. For example piezoelectric crystals may be used to apply a bending force to one or more optical components.

At block 61 the adjustable focussing element may be adjusted by alternating the focus distance of the image capturing apparatus 13 between the first focus distance and the second focus distance. A plurality of focus distances between the first focus distance and the second focus distance may also be provided. The adjustable focusing element may be alternated between the two focus distances a plurality of times. The adjustable focusing element may be alternated between the two focus distances repeatedly.

At block 63 the shutter 19 is opened and an image is captured. The shutter 19 may be a rolling shutter which is gradually moved across the image sensor 15. In the example of FIG. 4 the shutter may be moved in a vertical direction across the image sensor 15. It is to be appreciated that in other examples the shutter 19 may be moved in a different direction.

Blocks 61 and 63 may be performed simultaneously so that the adjustable focussing element 53 is adjusted as the image is captured. This causes different focus distances to be provided as the image is captured. The resulting image which is obtained by the image sensor 15 may comprise a plurality of different regions where different regions have different focus distances.

At block 65 the raw image 55 is provided by the image sensor 15. The raw image 55 comprises the image which has been obtained by the image sensor 15. The raw image 55 may be provided to the processor 3 to enable image processing to be performed on the raw image 55.

The raw image 55 comprises a plurality of regions where the regions have different focus distances. In the example of FIG. 4 the shutter has been moved in a vertical direction across the image sensor 15 and so the regions comprise a plurality of stripes as illustrated in FIG. 4. In the example of FIG. 4 the stripes extend horizontally across the raw image 55. It is to be appreciated that in other examples the regions may have different shapes, for example if the shutter 19 were to move horizontally vertical stripes may be obtained.

At block 67 the processor 3 may perform image processing on the raw image 55 to enable focussed images to be obtained. At block 67 the processor may obtain a subset of regions of the raw image 55. The processor 3 may identify the regions of the raw image 55 which have the same or a similar focus distance and then isolate these regions for further processing.

In some examples a plurality of subsets of regions 57 may be obtained. In the particular example of FIG. 4 five subsets of regions are obtained where each subset has a slightly different focus distance that the previous subset.

At block 69 the processor 3 processes the obtained subset of regions 57 to obtain a full sized image 59. For example the processor 3 may rescale the subset of the regions to a full size image. In the example of FIG. 4 five subsets of regions where obtained and five full scale images 59 may be obtained from the subsets.

Figure 5A:

FIGS. 5A to 5K illustrate images which may be obtained using the above mentioned examples. FIG. 5A comprises a raw image 55 which may be obtained from the image sensor 15. The different regions of the raw image 55 can be seen as horizontal stripes across the raw image.

FIGS. 5B, 5D, 5F, 5H and 5J comprise compressed images comprising the subsets of regions 57. The compressed images may be obtained by processing the raw image 55 as described above in relation to FIG. 4.

FIGS. 5C, 5E, 5G, 5I and 5K comprise full sized images 59 which may be obtained from the compressed images of FIGS. 5B, 5D, 5F, 5H and 5J. The full sized images 59 may be obtained by processing the compressed image as described above in relation to FIG. 4.

Figure 5B:
Figure 5C:
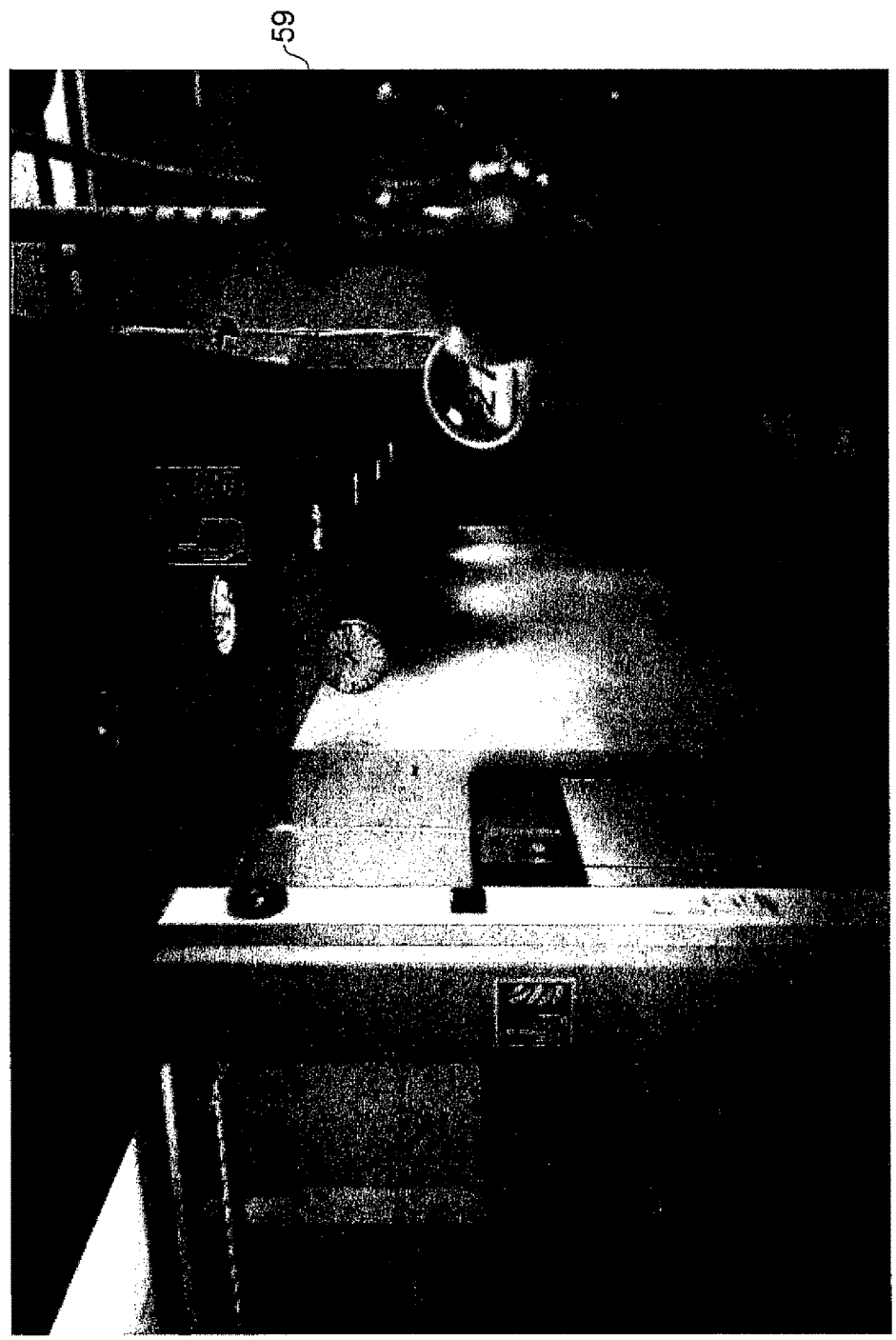

FIG. 5B comprises the compressed image which is obtained from a first subset of regions 57 which have an infinite focus distance. FIG. 5C comprises the full size image which is obtained from the compressed image of FIG. 5B. These images may be obtained from the sections of the raw image 55 which were captured when the optical configuration 17 was in the first configuration illustrated in FIG. 4.

Figure 5D:
Figure 5E:
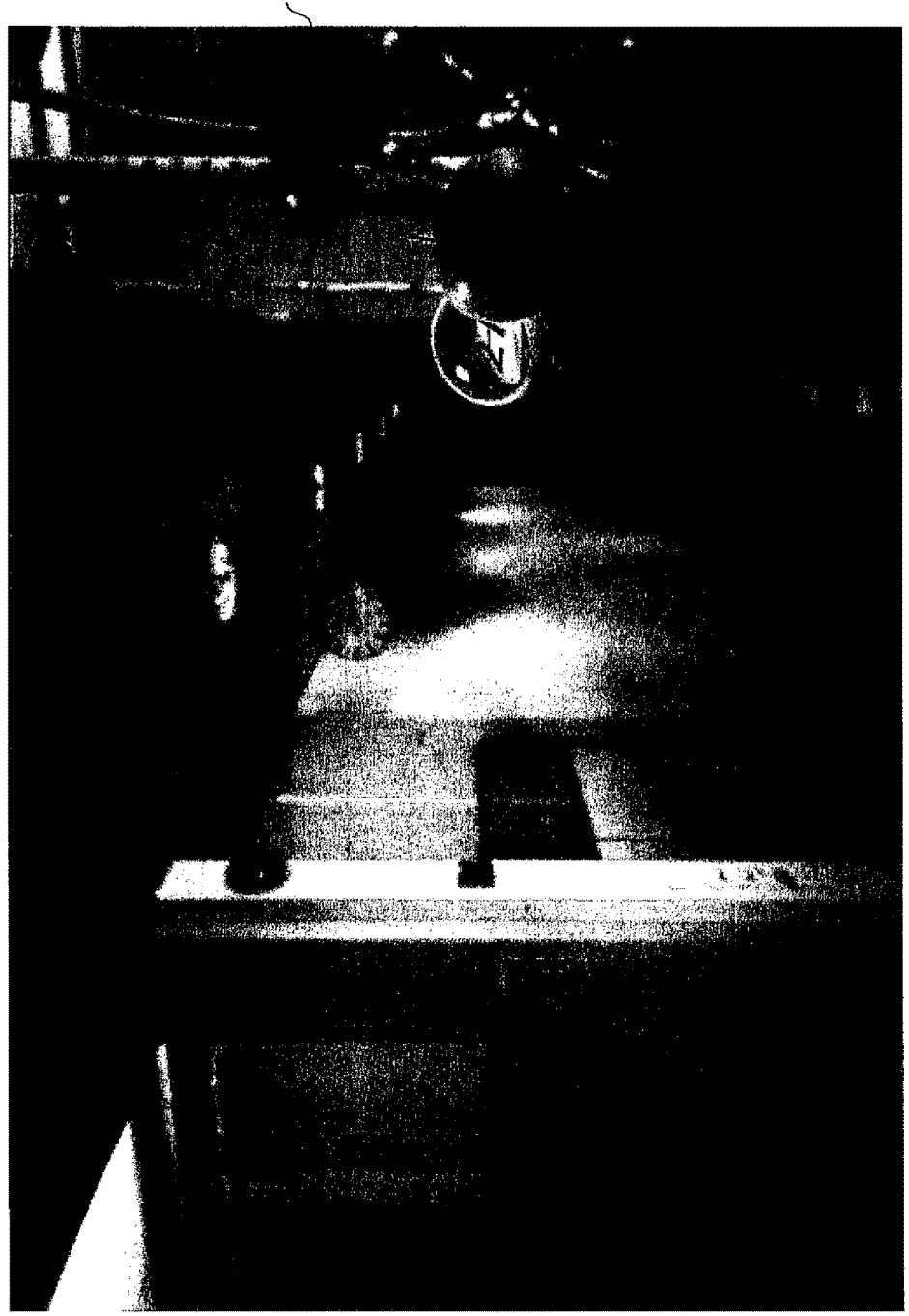

FIG. 5D comprises the compressed image which is obtained from a second subset of regions 57 which have a long range focus distances. FIG. 5E comprises the full size image which is obtained from the compressed image of FIG. 5D. These images may be obtained from a second subset of regions which have a long range focus distances. In this example the focus distance is not infinite but may still be far away from the apparatus 1.

Figure 5F:
Figure 5G:
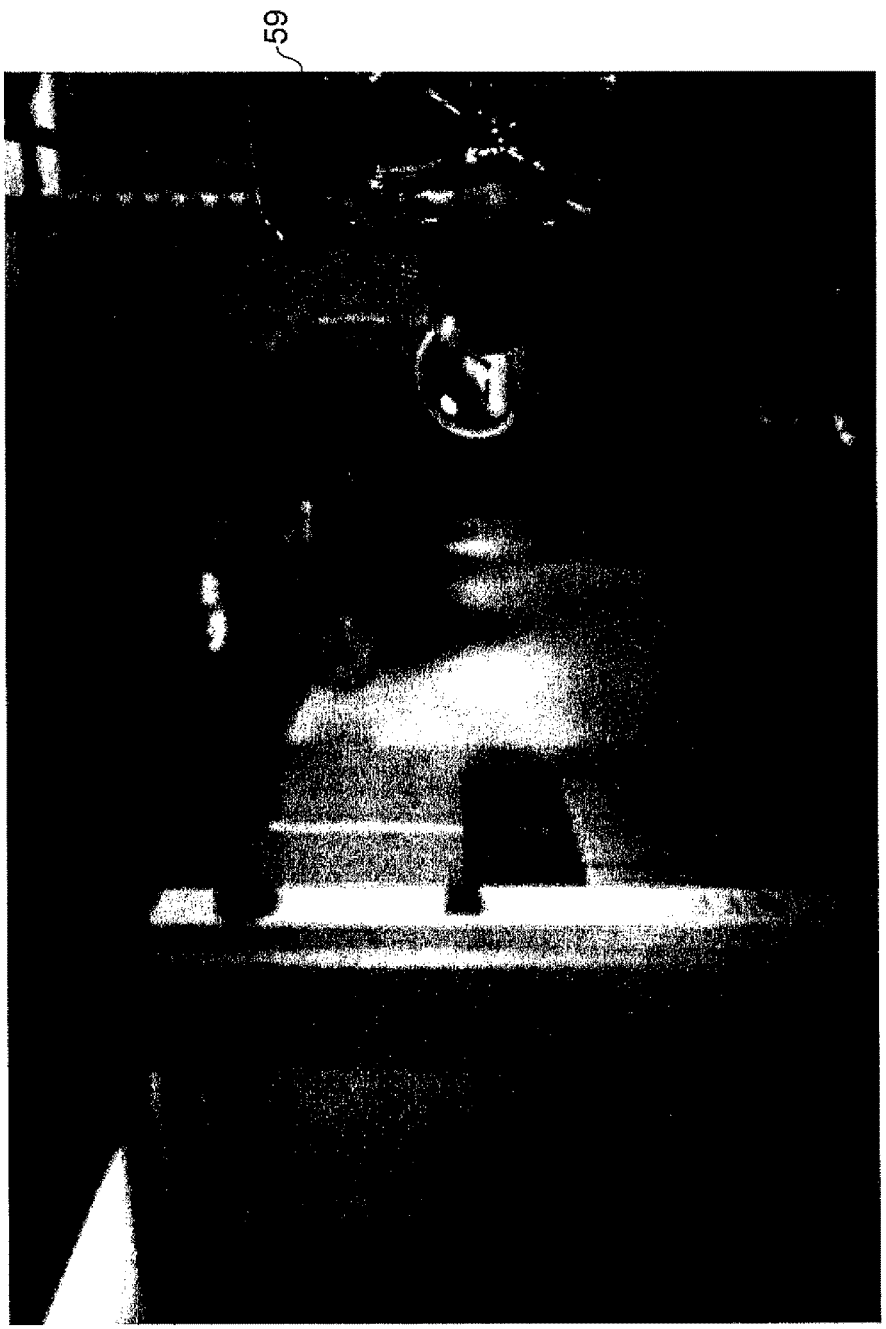

FIG. 5F comprises the compressed image which is obtained from a third subset of the regions 57 which have a shorter focus distance that the second subset. FIG. 5G comprises the full size image which is obtained from the compressed image of FIG. 5F.

Figure 5H:
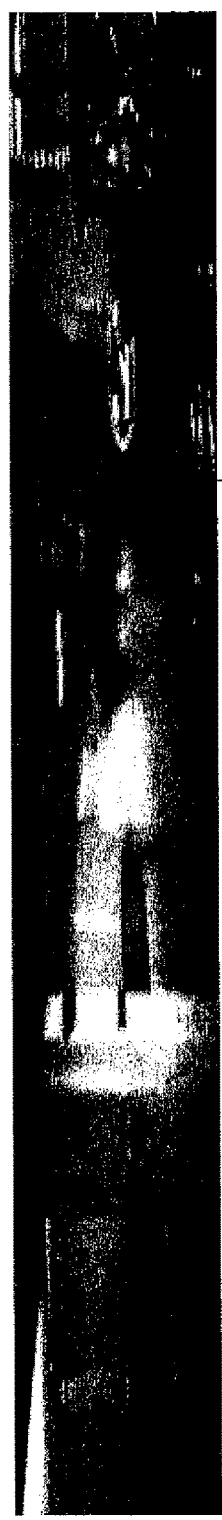
Figure 5I:

FIG. 5H comprises the compressed image which is obtained from a fourth subset of the regions 57 which have a shorter focus distance that the third subset. FIG. 5I comprises the full size image which is obtained from the compressed image of FIG. 5H.

The images of FIGS. 5D to 5I may have been obtained from the sections of the raw image 55 which were captured when the optical configuration 17 was between the first configuration and the second configuration as illustrated in FIG. 4.

Figure 5J:
Figure 5K:

FIG. 5J comprises the compressed image which is obtained from a fifth subset of the regions 57 which have a shorter focus distance that the fourth subset. The focus distance of the fifth subset of regions may be close to the apparatus 1. FIG. 5K comprises the full size image which is obtained from the compressed image of FIG. 5J. The image of FIGS. 5J and 5K may be obtained from the sections of the raw image 55 which were captured when the optical configuration 17 was in the second configuration illustrated in FIG. 4.

In the particular examples of FIGS. 5C, 5E, 5G, 5I and 5K the subsets are scaled up by a factor of five to obtain a full sized image.

The above described examples relate to an apparatus 1 which may enable a plurality of images to be obtained from a single captured image where the obtained images have different focus distances. As the images are obtained from a single captured image this may reduce effects such as blurring of the image due to movement of the objects or the apparatus 1. This may enable a user to obtain multiple representations of the same scene with different objects in the scene in focus.

In the examples the focussing of the image may be achieved through the processing of the raw image 55. This may allow the user to select which object they wish to be in focus after the raw image 55 has been captured. For example the apparatus 1 may comprise a user input device such as a touch screen which may allow a user to select an object in the raw image 55 which they wish to focus. The processor 3 may then be configured to select the subset of regions with the appropriate focus distance which enable the selected object to be focussed and use these to recreate a full sized image.

The raw image 55 may comprise information using a range of focus distances and may be used to generate depth maps. The depth map may then have uses such as enabling filtering of the image, focussing across the image and generating 3D images and video with refocusing The blocks illustrated in FIGS. 3 and 4 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In the detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
an image sensor,
an optical arrangement comprising at least one adjustable focusing element, wherein the adjustable focusing element is configured to alternate between a first focus distance and a second focus distance as an image is captured by the image sensor, and wherein the image captured by the image sensor comprises a plurality of regions where the regions have different focus distances, wherein the apparatus is further configured to obtain at least one focused image from a subset of the plurality of regions of the image captured by the image sensor;
at least one processor; and
at least one memory including computer program code
the at least one memory and the computer program code configured to, with the at least one processor, cause the apparatus to perform at least the following:
identify a subset of the plurality of regions of the image captured by the image sensor where each of the regions in the identified subset have the same focus distance; and
obtain a focused image by rescaling the identified subset of regions of the image captured by the image sensor.

2. An apparatus as claimed in claim 1 wherein the apparatus comprises a rolling shutter.

3. An apparatus as claimed in claim 2 wherein the adjustable focusing element is synchronised with the rolling shutter.

4. An apparatus as claimed in claim 1 wherein the adjustable focusing element is configured to alternate between the first focus distance and the second focus distance a plurality of times as the image is captured by the image sensor.

5. An apparatus as claimed in claim 1 wherein the adjustable focusing element is configured to provide a plurality of focus distances between the first focus distance and the second focus distance.

6. An apparatus as claimed in claim 1 wherein the first focus distance comprises a distance which is far away from the apparatus.

7. An apparatus as claimed in claim 6 wherein the first focus distance comprises infinity.

8. An apparatus as claimed in claim 1 wherein the second focus distance comprises a distance close to the apparatus.

9. An apparatus as claimed in claim 1 wherein the regions comprise a plurality of stripes across the image.

10. An apparatus as claimed in claim 1 wherein the image captured by the image sensor comprises a single image, and wherein the single image comprises the plurality of regions where the regions have different focus distances.

11. A method comprising:
adjusting an adjustable focusing element of an optical arrangement between a first focus distance and a second focus distance;
enabling an image to be captured by an image sensor as the adjustable focusing element is adjusted;
wherein the image captured by the image sensor comprises a plurality of regions where the regions have different focus distances;
obtaining at least one focused image from a subset of the plurality of regions of the image captured by the image sensor; and
identifying a subset of the plurality of regions of the image captured by the image sensor where each of the regions in the subset have the same focus distance;
wherein the focused image is obtained by rescaling the identified subset of regions of the image captured by the image sensor.

12. A method as claimed in claim 11 wherein the image is captured using a rolling shutter.

13. A method as claimed in claim 12 wherein the adjustable focusing element is synchronised with the rolling shutter.

14. A method as claimed in claim 11 wherein adjusting the adjustable focusing element comprises alternating between the first focus distance and the second focus distance a plurality of times as the image is captured by the image sensor.

15. A method as claimed in claim 11 wherein adjusting the adjustable focusing element comprises providing a plurality of focus distances between the first focus distance and the second focus distance.

16. A method as claimed in claim 11 wherein the first focus distance comprises a distance which is far away from the apparatus.

17. A method as claimed in claim 16 wherein the first focus distance comprises infinity.

18. A method as claimed in claim 11 wherein the second focus distance comprises a distance close to the apparatus.

19. A method as claimed in claim 11 wherein the regions comprise a plurality of stripes across the image.

20. A computer program stored in a non-transitory computer storage medium wherein the computer program comprises program instructions for causing a computer to perform the method of claim 11.

21. A non-transitory computer readable medium embodying the computer program as claimed in claim 20.

22. A method as claimed in claim 11 wherein the image captured by the image sensor comprises a single image, and wherein the single image comprises the plurality of regions where the regions have different focus distances.

23. A computer program product comprising a non-transitory computer-readable medium bearing computer program code embodied therein for use with a computer, the computer program code comprising:

code for adjusting an adjustable focusing element of an optical arrangement between a first focus distance and a second focus distance;

code for enabling an image to be captured by an image sensor as the adjustable focusing element is adjusted;

wherein the image captured by the image sensor comprises a plurality of regions where the regions have different focus distances;

code for obtaining at least one focused image from a subset of the plurality of regions of the image captured by the image sensor; and code for identifying a subset of the plurality of regions of the image captured by the image sensor where each of the regions in the subset have the same focus distance;

wherein the focused image is obtained by rescaling the identified subset of regions of the image captured by the image sensor.

* * * * *